United States Patent [19]

Kurucz et al.

[11] 4,145,446

[45] Mar. 20, 1979

[54] PROCESS AND APPARATUS FOR PRODUCING A UREA FATTY ACID ADDUCT CONSISTING OF SOLID PARTICLES

[75] Inventors: Eva Kurucz; Piroska Lukacs; Lajos Kollar; Jozsef Barics; Jozsef Gulyas; Laszlo Zolna; Balazs Juhasz; Lajos Fodor; Sandor Gal; Janos Hollo; Ernö Pungor; Janisz Sztatisz; Jenö Zolnay, all of Budapest, Hungary

[73] Assignees: Növényolajipari es Mososzergyarto Vallalat; Budapesti Müszaki Egyetem, both of Budapest, Hungary

[21] Appl. No.: 792,561

[22] Filed: May 2, 1977

Related U.S. Application Data

[63] Continuation-in-part of Ser. No. 661,498, Feb. 26, 1976, abandoned.

[51] Int. Cl.² ............................................... A23K 1/22
[52] U.S. Cl. ........................................ 426/69; 426/807; 260/96.5 C
[58] Field of Search ............... 426/2, 69, 656, 807; 260/96.5 B, 96.5 C, 398, 404, 553 R

[56] References Cited

U.S. PATENT DOCUMENTS

| 2,985,641 | 5/1961 | Herrmann | 260/96.5 R |
| 3,748,319 | 7/1973 | Tolle et al. | 260/96.5 C |

*Primary Examiner*—R. B. Penland
*Attorney, Agent, or Firm*—Toren, McGeady and Stanger

[57] ABSTRACT

A process is disclosed for the production of a urea-fatty acid adduct composed of discrete solid particles and having high protein and starch equivalent values wherein an aqueous solution or melt of urea at increased temperature is reacted with a fatty acid or a mixture of fatty acid and neutral fat at an increased temperature in a weight ratio of urea to fatty acid between 40 : 60 and 60 : 40 in a confined reacting space for about 2.5 to 10 seconds and wherein the mixture has been sprayed into a spraying space to allow the particles to crystallize in the air stream from the spraying.

9 Claims, 4 Drawing Figures

PROCESS AND APPARATUS FOR PRODUCING A UREA FATTY ACID ADDUCT CONSISTING OF SOLID PARTICLES

CROSS-REFERENCE TO RELATED APPLICATIONS

This application is a Continuation-in-Part of prior application Ser. No. 661,498, filed Feb. 26, 1976, now abandoned.

BACKGROUND OF THE INVENTION

1. Field of the Invention

The invention concerns a process and apparatus for the production of a urea fatty acid adduct (molecular compound) consisting of discrete solid particles and of high protein and starch equivalent value. More particularly, the invention concerns the production of a product which contains vegetable and/or animal fatty acid, or a mixture of fatty acid and fats, and urea which is of high food value, and suitable for adjusting to any desired ratio the protein and energy levels of fodder; which does not contain fillers, and is solid, in particulate form, readily pourable and mixable at will; and which contains only the mentioned fatty acids, and optionally fats, and urea in the form of a molecular or inclusion compound (hereafter referred to as an adduct) without any carrier, diluent or other foreign material.

2. Description of the Prior Art

It is known that reliable feeding of urea in an amount adequate from the nutritional point of view, animal feeding is only possible if a suitable retarding material is simultaneously given to the animal. This material makes it possible, by delaying the breakdown of urea, for the micro-organisms in the rumen to maximally exploit the ammonia arising from the hydrolysis of urea for the purposes of protein synthesis. At the same time, it is a fundamental condition of the optimal synthesis of protein and the utilization of the proteins already present and those that are formed, that at the same time an appropriate energy content in the fodder be ensured.

The latter may very well be achieved by fatty acids which can be exploited directly and rapidly as a source of energy without residue and without the need for the activity of a lipase enzyme, both by the micro-organisms and by the animals being fed.

For this reason, the advantage of using urea and fatty acids together has already been recognized. However, in practice, both in large-scale feeding practice and in preparation of the so-called fodder pre-mixes, the direct and homogeneous mixing of the fats available for fodder with the fodder has caused serious difficulties. To eliminate these difficulties and to facilitate the feeding and adjustment, it has already been proposed to utilize adducts formed by urea with fatty acids or partially with neutral fats in fodder and fodder pre-mixes. Such adducts, which may for instance contain a 45-60% fatty acid - fat mixture bound as a molecular compound, are well suited on the basis of their composition for the adjustment of the desired concentration of fat required in relation to the urea in the fodder. In addition, they have the further advantage that, in such adducts, the hygroscopic property of urea is not exhibited.

This property also causes difficulties in the case of the homogeneous mixing of free urea into coarse meal fodders, because such a urea-containing mixture is prone to agglomeration and bridging. Thus, the addition of urea-fatty acid adducts to fodder ensures the exploitation of urea (because of the retarding effect of the fatty acid) as well as the effective utilization of the energy-rich fats (in view of the partial protein substituting property of urea). Additionally, the technological and feeding difficulties arising from the separate use of urea and fats are eliminated.

However, the urea-fatty acid adducts produced by known methods are generally of a pasty consistency and contain water as well, so in this form they are not suitable for mixing with fodder in conventional fodder mixing devices or in other simple ways. For this reason, according to Hungarian Patent Specification No. 162126, a particulate product is prepared which is readily mixable with fodder and which contains a urea-fatty acid adduct in a proportion favorable from the point of view of nutrition (40:60 — 60:40), by mixing a heated aqueous solution of urea and hot fatty acid (or a mixture of fatty acid and fat) to form an adduct and thereafter, adding a particulate carrier material which binds the water content and which is itself utilizable for feeding. Thereafter, rape seed grits are mixed in to the mixture and the solid mass obtained after cooling is ground. In this way, a particulate adduct preparation containing about 50% seed grits is obtained.

Experiments have also been carried out to produce a product containing no particulate carrier but rather, contains only the pure urea-fatty acid adduct in the form of a dry particulate or powdery product which is easily mixable with fodder. Such a process is described in U.S. Pat. No. 3,748,319, wherein crystalline urea is formed into a slurry with an amount of water insufficient to dissolve the urea, then, in a shearing mixer, the fatty substance is mixed with this slurry in a weight ratio, such that one part by weight of fatty substance is mixed with 2.5 to 5.5 parts by weight of urea. Finally, the thus obtained watery mass is dried in an air stream and comminuted. In this way, a dry pulverulent product is obtained wherein the fatty acid-urea ratio is at least 1:3; generally, however, it is around 1:5. According to the description, the observation of the given weight ratios as well as the other operational parameters is essential because otherwise, dissociation occurs or a product of insufficient quality results. If a larger relative amount of fatty substance is used, the satisfactory mixing of the aqueous urea slurry and the fatty substance cannot be ensured. The product having the above-mentioned composition is not, however, at all satisfactory from the nutritional point of view. Its fatty acid content relative to the urea is too low, so that it does not ensure an adequate energy level. Moreover, the mixing, occurring under shear conditions and the drying of the large quantity of watery material at a low temperature in an air stream, make it difficult to perform the process on a large scale. Thus, from the nutritional point of view, the production of an adduct of the desired composition, which contains urea and fatty acid or a mixture of fatty acid and fatty substances in an approximately equal mass ratio, which is free of fillers; and which is obtained in a dry, non-agglomerating, particulate or pulverulent form, has not been possible at all with the known processes.

SUMMARY OF THE INVENTION

The invention is based on the discovery that one may produce a 100% adduct which is ideal from the nutritional point of view; which has an urea-fatty acid weight ratio between 60:40 and 40:60; which is pure, free of fillers, unreacted starting materials and dissociation products, and which is in the form of a dry, particulate or pulverulent, non-agglomerating product, by a technologically simple process. This is accomplished by using urea in the form of a solution made with water in a sufficient amount to ensure a liquid state (0 to 30% by weight water) and with heat (60° to 140° C.) or, in the case where there is a small amount of water present, in the form of a melt. The urea in this form and at this temperature is introduced into a confined reaction space, e.g., a tube reactor, together with fatty acid (or a mixture of fatty acid and fat at a temperature sufficient to melt it, i.e., 35°–105° C.). In the reaction space, the materials react rapidly, the reaction or residence time in the reaction space being from about 2.5 to 10 seconds. The thus reacted material is then immediately sprayed into a spraying space which results in crystallization of the adduct which settles out and collects at the bottom of the reaction space. This crystallizing step can be carried out at ambient temperature, e.g., 20° C.

Thus, the separately prepared and heated urea solution and fatty acid melt come into contact only directly before spraying or even during spraying; the reaction forming the adduct takes place rapidly and in the event of maintaining the above-mentioned 60:40 — 40:60 weight ratio, and a dry pulverulent or particulate, loose-structured 100% adduct is deposited at the bottom of the spraying space, wherein neither the hygroscopic nature of the urea nor the adhesive, fatty character of the fatty substance prevails.

The primary object of the invention is therefore a process for the production of a urea-fatty acid adduct consisting of discrete, solid particles and suitable for the adjustment of the urea and fatty substance content of feedstuffs for ruminating animals which is characterized by preparing a solution or melt from the urea with 0 to 45% water at 60° to 140° C., bringing this together with the fatty acid, or with a mixture of fatty acid and neutral fat melted at 35° to 105° C., in a weight ratio, calculated on pure urea, of between 40:60 and 60:40 of urea to fatty acid, and spraying the mixture into a spraying space wherein the sprayed particles proceed in an air stream and are allowed to remain therein until they crystallize.

DESCRIPTION OF THE PREFERRED EMBODIMENT

Figure 4:
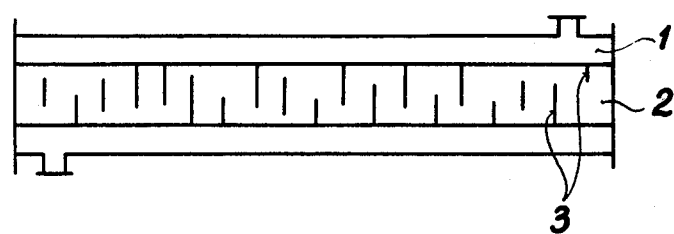
FIG. 4 is a schematic illustration of the tube reactor used in carrying out the process of the present invention.

The mixing together of the heated liquid urea and liquid fatty acid (or fatty acid-fat mixture) takes place directly before spraying into a closed reaction space connected in front of the spraying apparatus, which, in desired cases, may be a tube reactor of per se known construction suitable for causing the adduct-forming reaction to take place at a controlled temperature and with a controlled residence time of about 2.5 to 10 seconds. However, expediently a tube reactor is employed which has a length-to-diameter ratio of between 10:1 and 50:1, and inside of which there are baffle plates spaced from each other by ⅓ to ½ diameter and angularly displaced relative to each other by 60 to 90 degrees, which plates reduce the free cross-section to 1/6 to 2/6 of the original dimensions. In this way, in such a tube reactor, the linear flow rate of the reaction mixture increases to 3- to 6-fold of its value, calculated for the free cross-section. Such a tube reactor is schematically illustrated in FIG. 4 and is provided with a cooling and heating jacket 1, a reaction space 2 and baffle plates 3. The spraying of the thus obtained and partly or wholly reacted liquid mixture may take place in any known spraying device operated with compressed air, the so-called "duplex" spray head. It is to be noted that by a suitable choice of the manner of spraying or the pressure employed, the particle size of the sprayed product, as well as its particle size distribution, may be regulated.

From the point of view of producing a desired particulate, dry and non-agglomerating product, an important role is played by the spraying space employed downstream of the sprayer which provides a sufficiently long path for the air stream carrying the sprayed particles to allow the adduct to crystallize in the air stream. This spraying space generally is a cylinder dimensioned to an appropriate length of several meters, in which the sprayer is arranged either at the upper or the lower end. Thus, the spraying may take place downwardly or upwardly; the falling sprayed particles collect in a dry state at the bottom of the cylindrical space from where the obtained product may be removed continuously.

The new process according to the invention accordingly differs primarily from the processes of this nature which have heretofore been used for producing solid urea-fatty acid adduct products for use as animal feed supplements in that the two components of the adduct, namely, the urea and the fatty acid (or the fatty acid-fat mixture) are reacted with each other exclusively in a liquid phase without solid carriers with the obviation of all foreign materials except for the small amount of water used for making the urea liquid with the use of heat.

The two components are used in a weight ratio of between 40:60 and 60:40, since this weight ratio makes it possible to directly obtain, by spraying under the described conditions, a solid, pulverulent, dry product consisting of discrete particles, which contains both the urea and the fatty acid in the most favorable weight ratio from the point of view of adjustment of the protein value and energy level of the fodder and of utilization of the urea by ruminating animals.

A further advantage of the process according to the invention is that it may be carried out in a continuous operation with simple apparatus, the parameters of the process being favorable also from the point of view of the gentle treatment of the materials; the obtained product is a pure 100% adduct, which in spite of its high fatty acid content does not contain free fatty acid or fatty substance. It is also due to the favorable conditions of the process that the product shows no degradation by oxidation, which is proved by the low peroxide number of the product.

Preferred embodiments of carrying out the process according to the invention are described in detail in the following examples:

EXAMPLE 1

From 82 kg of urea a solution is prepared by the addition of 28 kg of water at 102° C. and with this is mixed 50 kg of so-called "goudron" fatty acid melt at 80° C., which is a residue obtained as a by-product of fatty acid manufacture and which additionally contains 0.1% by weight of an emulsifier and 0.02% by weight of an anti-oxidant. Then this mixture is sprayed from above downwardly in a so-called "duplex" sprayer operated with air at a pressure of 1.7 atmospheres into a cylindrical spraying space of vertical axis, 6 m high and 1.3 m in diameter. The above-specified amount of liquid mixture of urea and fatty acid requires 25 Nm$^3$ of air for the spraying. The falling dry solid product collects at the bottom of the spraying space; 135 kg of readily crumbled, directly packable product is obtained with a peroxide number of 5.3.

Figure 1:
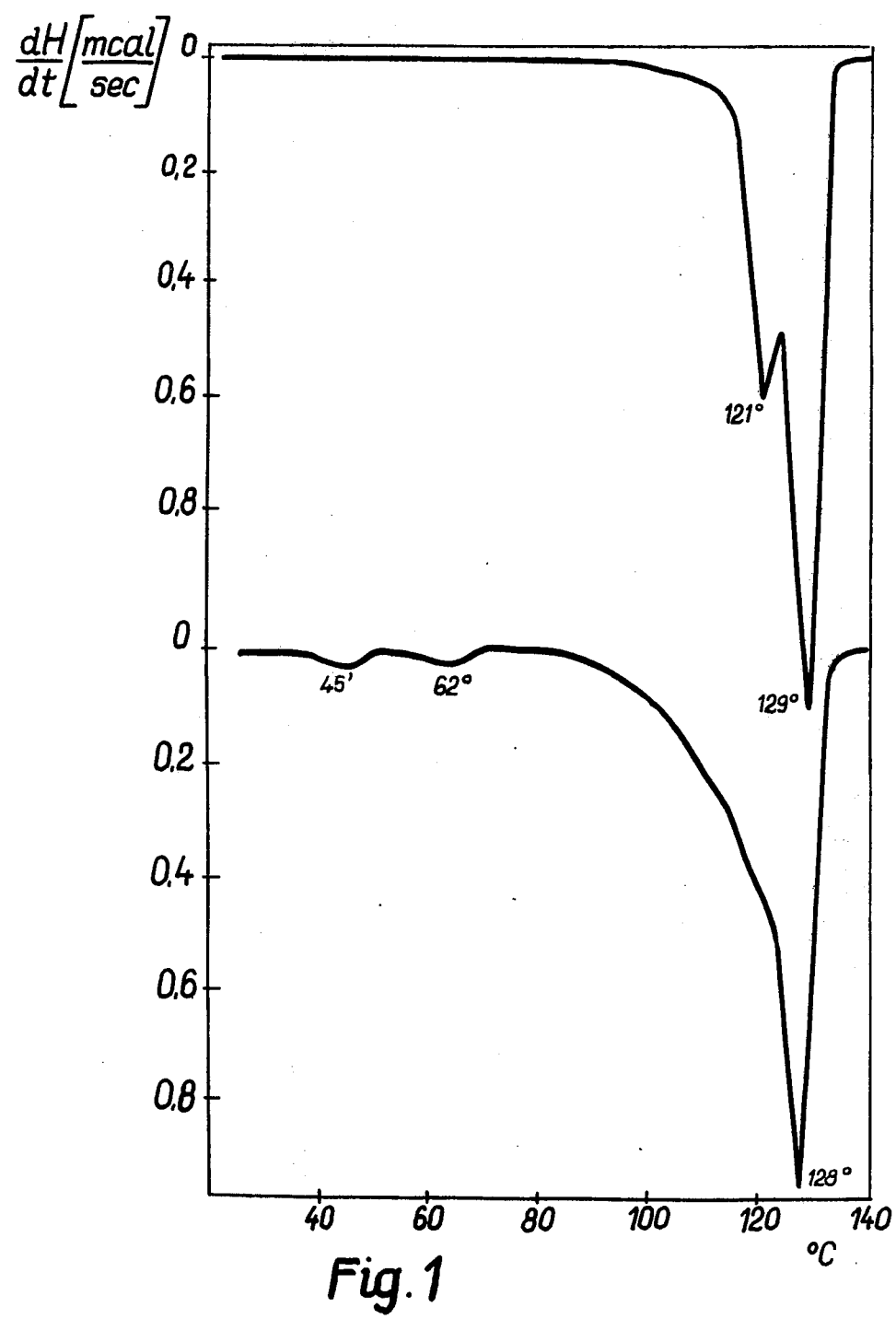
FIGS. 1, 2, and 3 are schemes from the dynamic micro-calorimetric analysis of samples of products produced by the present invention.

The quality of the product was monitored by a dynamic micro-calorimetric (DSC) method. In the course of heating the product, the curve obtained with a recording micro-calorimetric is shown in FIG. 1 as the upper curve; the initial straight section of the curve shows that the product did not contain any material that melts under 100° C., such as, free fatty acid or fat; the double peak between 120°-135° C. corresponds to the pure adduct and the urea generated by the thermal dissociation of the adduct. The lower curve on the figure is the curve of the experiment repeated with the thermally dissociated product and shows the presence of urea and free fatty acid produced by the irreversible thermal dissociation of the adduct.

EXAMPLE 2

The process according to Example 1 was repeated in the same apparatus and with the same spraying conditions, but with a mixture of a melt having a temperature of 135° C. obtained by the addition of 1 kg of water to 65 kg of urea and a "goudron" melt of 65 kg at 80° C.

The thus obtained product is readily crumbled and is of good quality. Its production was monitored in accordance with the method described in Example 1.

EXAMPLE 3

The process according to Example 1 was repeated in the same apparatus and under the same spraying conditions, but in place of "goudron", a melt of 80° C. was used from 50 kg of tallow acids.

The product obtained after cooling was in a readily crumbled, packable condition.

Figure 2:
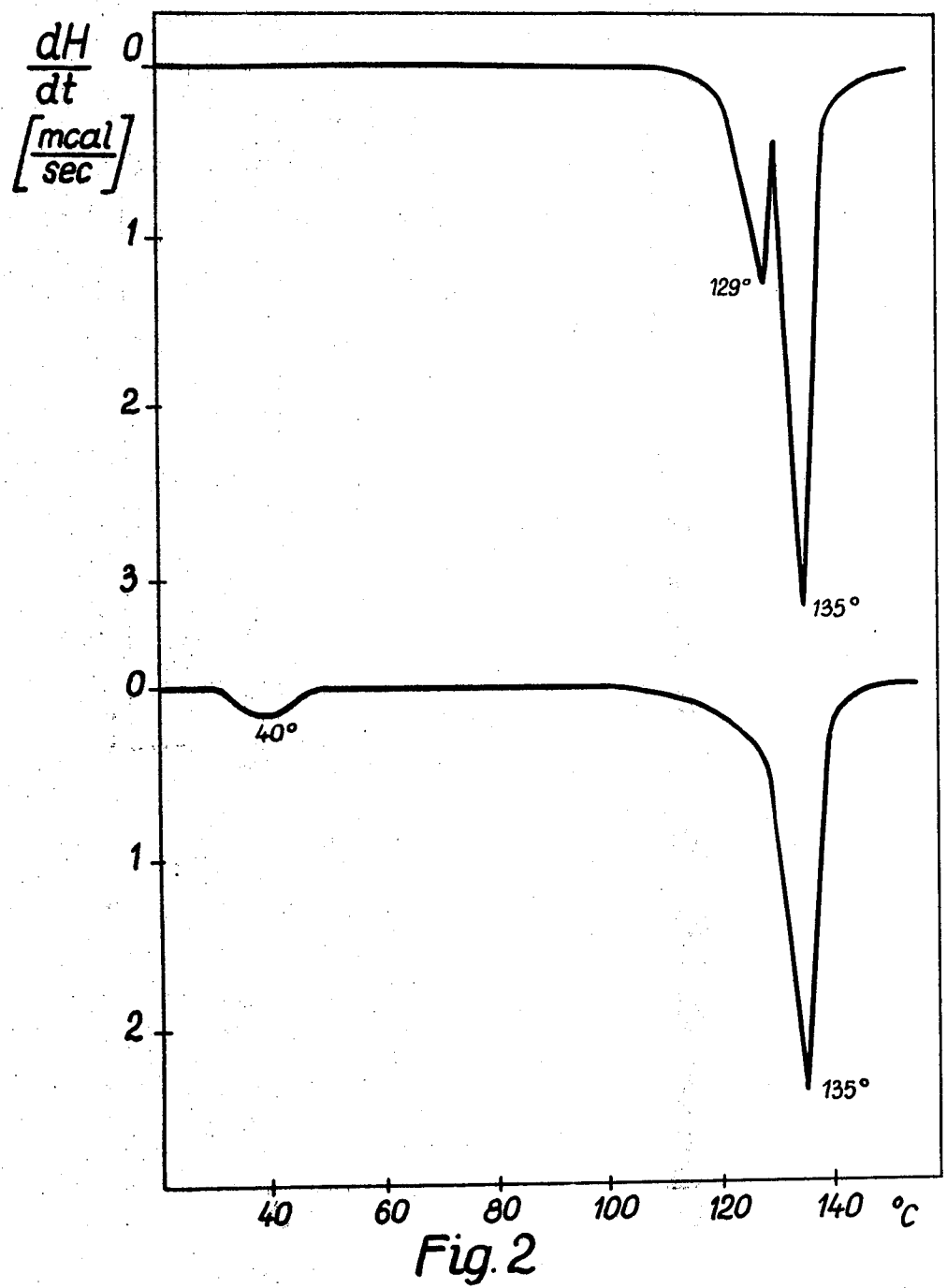

The adduct character of the product obtained was monitored by a differential micro-calorimetric (DSC) method. The double peak appearing between 120° to 135° C. in FIG. 2 proves the good quality of the product. The peroxide number of the product was 4.8.

EXAMPLE 4

The process according to Example 2 was repeated in the same apparatus and under the same spraying conditions but in place of "goudron", an 80° C. melt of 65 kg of tallow acids was used. The quality of the product obtained was identical with that in Example 2.

EXAMPLE 5

The process according to Example 1 was repeated in the same apparatus and with the same conditions of quantities used, but in place of the air-operated "duplex" sprayer, a pressurized so-called "simplex" spraying head operating without air was used. The amounts specified in Example 1 were sprayed out in 15 minutes.

The product collected at the bottom of the spraying space has a temperature of 50° C., after cooling a readily crumbling, packable product was obtained, the quality of which corresponded with that in Example 1.

EXAMPLE 6

The process was carried out as described in Example 5, but as the cooling medium, 2000 Nm$^3$ air was blown into the spraying space in 15 minutes. The product collected at the bottom of the spraying space had a temperature of 30° C. The quality of the product corresponded with that in Example 1.

EXAMPLE 7

The process described in Example 6 was repeated in the same apparatus and with the same spraying conditions, but with the mixture described in Example 2. The product was a dry, pulverulent adduct, the quality of which agreed with that in Example 2.

EXAMPLE 8

The process described in Example 6 was repeated in the same apparatus and with the same spraying conditions, but with the mixture described in Example 3. The product was an averagely flowable, pulverulent, good quality adduct.

EXAMPLE 9

In a vessel, a solution at 105° C. was prepared from 82 kg of urea and 20 kg of water. In another vessel, 83 kg of "goudron"-type fatty acid was melted at 50° C., it contained also 0.1% by weight of emulsifier and 0.02% by weight of anti-oxidant. "Goudron" is a technical mixture of fatty acids having 14 to 22 carbon atoms (the major part having 18 carbon atoms) which also contains about 10% of neutral fats of vegetable and animal origin. "Goudron" is obtained as a by-product from the manufacture of fatty acids and may also contain small amounts of contaminating materials originating from the manufacturing process. A two-headed pump of the type Bran Lubbe Normados NC 32 had one of its suction pipes connected to the urea-containing vessel while its other suction pipe was connected to the fatty acid melt-containing vessel. The pressure delivery tubes of the two pump heads were connected to respective pipes each of 10 m length and 12.5 mm inner diameter and each of these was connected to a tube reactor which served for mixing the urea solution with the fatty acid as well as for carrying out the adduct-forming reaction. The construction of this tube reactor is shown in FIG. 4; the reaction space 2 with baffle plates 3 is disposed within a cooling and heating jacket 1. The length of the reaction space is 0.55 m, its inner diameter 38 mm; the baffle plates had a surface area amounting to 2/6th of the inner cross-section of the tube reactor and were disposed at a mutual angular offset of 60 degrees and with a space of 15 mm. To the outlet opening of the tube reactor, a duplex sprayer operated with air at 1.7 atmospheres was connected for spraying the mixture arriving from the tube reactor from above downwardly into a spraying space of vertical axis, cylindrical shape, 6 m in height and 1.3 m in inner diameter.

The feed pump was so adjusted that the residence time of the mixture of the two liquids fed in at an equal rate in the tube reactor according to FIG. 4 was 10 seconds. The crystallization time, i.e., the time from which the reaction mixture was sprayed from the outlet of the tube reactor and allowed to crystallize and settle was from about 2 to 4 seconds. The complete feeding and spraying of the above-given quantity of material took one hour and 25 Nm$^3$ air was required for spraying the liquid reaction mixture.

Figure 3:
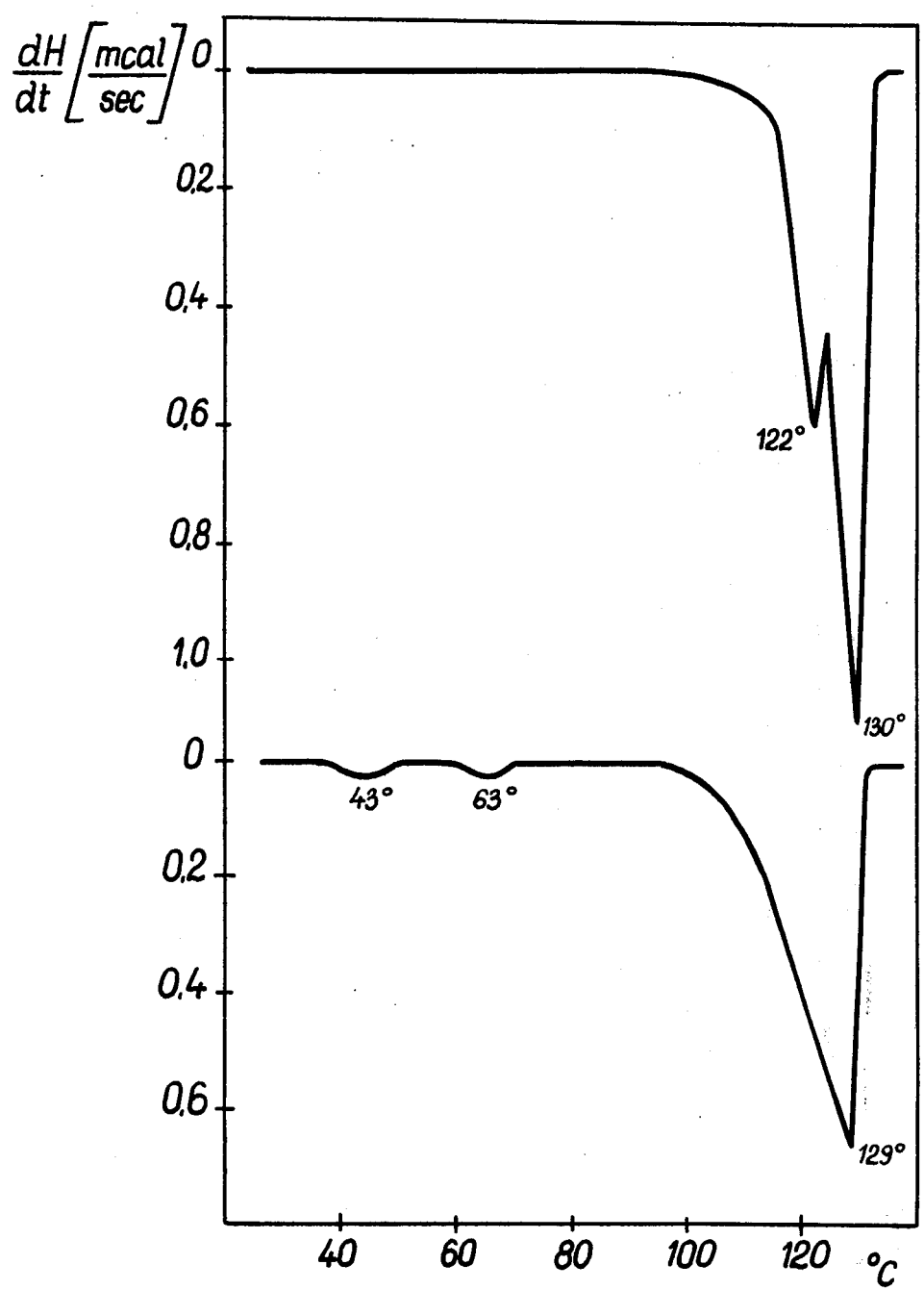

The falling dry product was collected at the bottom of the spraying space. 160 kg of solid product was obtained which, after cooling, was found to be a readily crumbling urea-fatty acid adduct ready for packing and having a peroxide number of 4.6. Its quality was monitored by the dynamic micro-calorimetric method; the shape of the curve shown in FIG. 3 and the double peak arising between 120° and 135° C. prove that the product was a pure adduct which did not contain free fatty acid or fatty substances.

EXAMPLE 10

The process according to Example 9 was repeated with unchanged amounts of material, but instead of pipes of 10 m length, the urea solution and the fatty acid melt were delivered via pipes of 2.2 m length directly to the tube reactor placed upstream of the spraying head, the residence time of the reaction mixture of urea and fatty acid in the tube reactor being 6 seconds.

The settled dry product quality agreed with the quality of the product described in Example 9.

EXAMPLE 11

The procedure described in Example 9 was repeated in the same apparatus and with the same arrangement but with a "simplex" spraying head in place of a "duplex" spraying head. The quantity of materials given in Example 9 was sprayed out in 15 seconds. The residence time of the reaction mixture in the tube reactor was 2.5 seconds. The settled dry product had a temperature of 45° C. and its quality corresponded with the quality of the product described in Example 9.

EXAMPLE 12

The process described in Example 11 was carried out in the same apparatus and with the same spraying conditions, but as a cooling medium, 2000 Nm$^3$ of air at 20° C. was introduced into the spraying space. The temperature of the settled dry product was 30° C. and its quality was the same as that described in Example 9.

EXAMPLE 13

The process described in Example 9 was repeated but in place of "goudron", tallow fatty acids were used. Otherwise, the conditions were identical to those above and similarly, a good quality adduct was obtained.

What is claimed is:

1. A process for the production of a urea-fatty acid adduct consisting of discrete solid particles which is suitable for the adjustment of the urea and fatty substance content of feed for ruminating animals, comprising preparing a solution or melt from urea with 0 to 45% water at 60° to 140° C., then reacting the solution or melt of urea with a fatty acid at 60° to 140° C., or a mixture of a liquid fatty acid and a neutral fat melted at 35° to 105° C., in a weight ratio of urea to fatty acid calculated on pure urea of between 40:60 and 60:40 in a reactor for a reaction period from about 2.5 to 10 seconds, and then spraying the reacted product into a spraying space wherein the sprayed particles proceeding in an air stream are allowed to remain therein until they crystallize and settle.

2. The process of claim 1 wherein the amount of water used is 0 to 30%.

3. A process according to claim 1 wherein the fatty acid, or mixture of fatty acid and fat comprise vegetable or animal fatty acids, or fats derived from such fatty acids, with a carbon atom number which is between 14 and 22 and is an even number.

4. A process according to claim 1 wherein the spraying is carried out with the aid of pressurized air.

5. A process according to claim 1 wherein the spraying is carried out with a sprayer operated with liquid pressure.

6. A process according to claim 1 wherein the process is carried out in continuous operation.

7. The process of claim 1 wherein the reaction temperature is from about 70° to 140° C.

8. The process of claim 1 wherein the sprayed particles remain in the spraying space for a period from 2 to 4 seconds.

9. The process of claim 1 wherein the spraying step is carried out at ambient temperatures.

UNITED STATES PATENT OFFICE
CERTIFICATE OF CORRECTION

Patent No. 4,145,446      Dated  March 20, 1979

Inventor(s) Eva Kurucz, et al

It is certified that error appears in the above-identified patent and that said Letters Patent are hereby corrected as shown below:

In the heading of the Patent the following should be added:

-- [30] Foreign Application Priority Data

March 11, 1975................Hungary  NO188 --.

Signed and Sealed this

Twenty-second Day of May 1979

[SEAL]

Attest:

RUTH C. MASON
Attesting Officer

DONALD W. BANNER
Commissioner of Patents and Trademarks